Oct. 4, 1932.  A. DAMICO  1,880,849
SIGNAL DEVICE
Filed Feb. 1, 1927   2 Sheets-Sheet 1
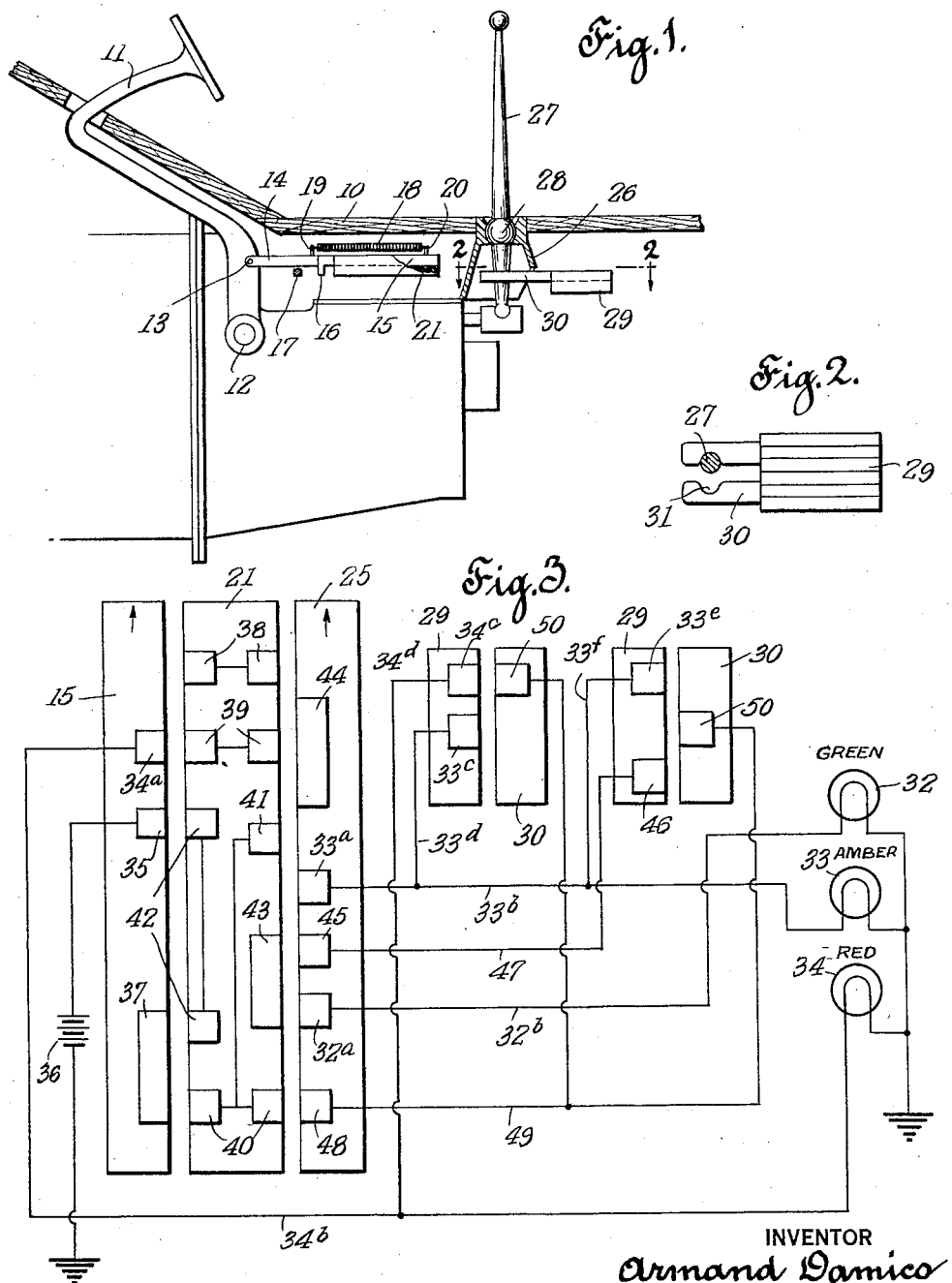

Oct. 4, 1932.  A. DAMICO  1,880,849

SIGNAL DEVICE

Filed Feb. 1, 1927  2 Sheets-Sheet 2

INVENTOR
Armand Damico
BY
Percy Freeman
ATTORNEY

Patented Oct. 4, 1932

1,880,849

UNITED STATES PATENT OFFICE

ARMAND DAMICO, OF WOODSIDE, NEW YORK

SIGNAL DEVICE

Application filed February 1, 1927. Serial No. 165,083.

This invention relates to signals with particular reference to such warning devices as adapted to motor driven vehicles.

One of the objects of this invention is to provide a signal device actuated by the brakes of the vehicle, by the gear shifting mechanism, and by the clutch of a vehicle operated singly or in conjunction with one another and to provide an improved and compact arrangement of the several signals in such device.

Another object is to provide improved means actuated by the manipulation of the controlling mechanism of a vehicle for automatically operating these signals which clearly indicate changes in the progress of the vehicle.

These and several other objects, which will become apparent as the description progresses, are accomplished by the novel construction, combination and arrangement of parts hereinafter described and illustrated in the accompanying drawings, forming a material part of this disclosure, and in which:—

Figure 1 is a partial longitudinal sectional view illustrating the application of the invention to a conventional clutch and gear shift mechanism.

Figure 2 is an enlarged partial sectional view looking on line 2—2 of Figure 1.

Figure 3 is a diagrammatical view of the method of connecting the elements as shown in Figure 1.

Figure 4:
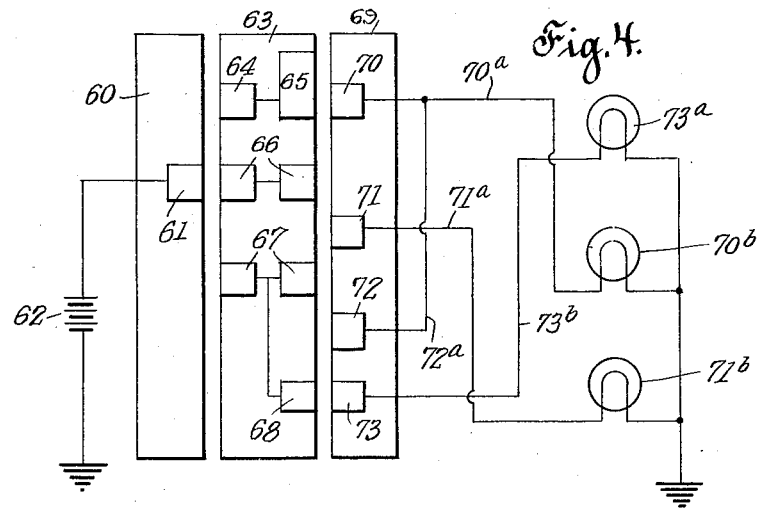
Figure 4 is a diagrammatical view showing the device as hooked up in a "Ford" automobile.
Figure 5:
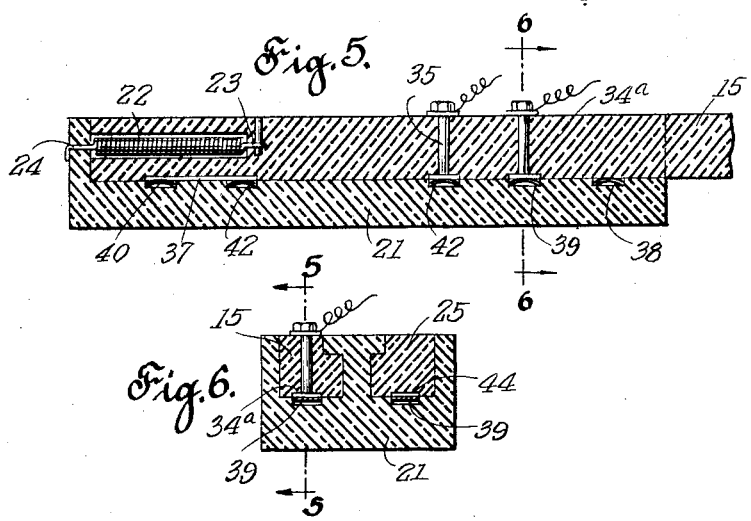
Figure 5 is a partial longitudinal sectional view of the contact blocks taken on line 5—5 of Figure 6.
Figure 6:
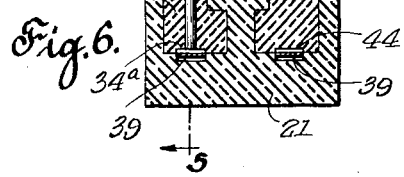
Figure 6 is a transverse sectional view taken on line 6—6 of Figure 5.
Figure 7:
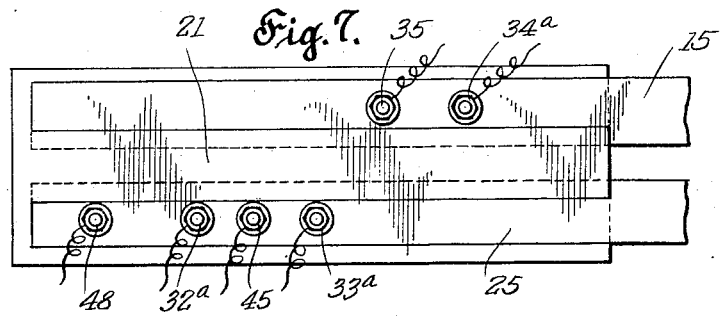
Figure 7 is a top plan view of the blocks as shown in Figure 5.

Referring now in detail to the drawings:—

The numeral 10 designates the foot-board of an automobile through which extends the usual clutch pedal 11, pivoted at 12 and a brake pedal. (Not shown.)

Pivoted to the pedal 11, at 13, is a rod 14 the free end of which normally abuts one end of an insulated slide 15, provided with a projection 16 adapted to limit the movement of the slide by engagement with a stop 17.

The rod 14 is coupled with the slide 15 by a spring 18 fastened at 19 to the rod and at 20 to the slide.

The slide 15 is movable in a block 21 and is coupled thereto by a spring 22 fastened at 23 to the slide and at 24 to the block.

The brake is connected in a similar manner to a slide 25 also mounted in the block 21.

Beneath the foot-board 10 is the usual transmission casing 26, the gears of which are shifted by the lever 27 provided with a universal joint 28.

In the rear of the casing 26 is a block 29 in which is horizontally movable a pair of slides 30, entering the casing and provided with recesses 31 adapted to receive the lower portion of the lever 27.

Mounted on the motor vehicle, in a convenient position, are three electric lights, 32, 33 and 34, green, yellow and red, respectively, marked Clear, Caution and Danger.

All of the several elements heretofore described are connected in the following manner.

The clutch slide 15 is provided with a short contact 34a, connected by a lead 34b to the red light 34.

Another short contact 35 connects with a source of current 36, while at the other end of the slide, there is a long contact 37.

The block 21 is provided with a pair of connected, oppositely disposed contacts 38, a second pair of similar contacts 39, a lower pair of connected contacts 40, the last named contacts being connected to another contact 41, a fourth pair of connected contacts 42 on the same side of the block and a free long contact 43.

The brake slide 25 is provided with a free long contact 44, a short contact 33a connected by a lead 33b to the yellow caution light 33. Another contact 45 is connected to the third speed contact 46 of the block 29 by a lead 47. Another contact 48 is connected by a lead 49 to the slide contacts 50 of the slides 30.

The reverse contact 34c of the block 29 is connected to the red light 34 by a wire 34d. The first speed contact 33c is connected by a lead 33d to the light 33. The second speed contact 33e is also connected to the light 33 by a wire 33b.

When the clutch 11 is disengaged, the slide 15 moves in the direction of the arrow in Fig. 3 and when the brake is applied, the slide 25 moves in the direction of the arrow in the same figure.

As shown in Fig. 3, the clutch is engaged, the brake is released and the vehicle is in reverse.

However, by reference to this figure, the following combinations may be traced.

If the gears are in the neutral, the clutch engaged and the brake released, no signal is displayed by the lights.

If the gears are in first speed, that is, contact 50, engaging contact 33c the clutch is engaged, and the brake released as in Fig. 3, the current from the source 36 passes through the contact 35, contacts 42, contact 37, contact 40, contact 48, lead 49, contact 50, contact 33c, lead 33b to illuminate the caution yellow light 33.

Thus the several possible combinations may easily be traced, to clearly illustrate the signals readable at each change of the vehicle operation as follows:—

When the gears are shifted to second speed 33e contacting with 50 and the clutch is engaged (the brake being released) the caution or yellow signal is illuminated. When the gears are shifted to "high" or direct drive (the clutch being engaged and the brake released) the green or "clear-ahead" signal is illuminated.

If the brake is applied, while the clutch is engaged the caution or yellow signal will be illuminated, regardless of the position of the transmission gears, current passing through contacts 35 to 42 to 37 to 40 to 41 to 33a and to lead 33b.

If the clutch is disengaged while the brake is applied, regardless of the position of the transmission gears, the red or "stop" signal will be illuminated.

Regardless of the position of the gears, if the clutch is disengaged and the brake released, none of the signals will be illuminated.

If gears are thrown "reverse" the red or "stop" signal will be displayed.

In the planetary system of speed gears, the clutch slide 60 is provided with a single contact 61 connected to a source of current 62. The block 63 is provided with a short and long contact 64 and 65 connecting, at the top, another pair of short contacts 66 connected and another pair 67, the last pair being connected with a single lower contact 68.

The brake slide 69 carries a contact 70 connected by a lead 70a to a yellow caution light 70b, another contact 71 connected by a lead 71a to a red danger light 71b, another contact 72 connected by a wire 72a to the lead 70a, and another contact 73 attached to a clear, green light 73a by a wire 73b.

Thus, when the transmission is in neutral and the brake is released, no signal appears.

If the transmission is in low speed, the yellow signal will light, and will remain illuminated even if the brake is applied.

If the transmission is in high speed, the green clear signal appears and should the brake now be applied, the yellow light would be displayed.

If while in a neutral position, the brake is applied, the red danger signal will light.

Thus, it will be seen that a novel and efficient signal system for motor vehicle has been disclosed.

Although I have described my improvements with considerable detail, it is to be understood that the foregoing is not to be interpreted as limitative, as changes may be be made without departing from the scope of the appended claims.

Having thus described my invention, what I claim as new and desire to secure by Letters Patent, is:—

1. A switch for operating an electric vehicle signal comprising an insulator block, the top face of the block being cut out to form a pair of independent angular channels, and a T-shaped wall between said channels, said channels extending from one end of the block to a point adjacent the opposite end thereof, a pair of members of the same cross sectional shape as the angular channels slidably arranged in the respective channels, retractile coil springs connecting the closed ends of the channels with the respective ends of the slidable members, contacts arranged in said channels, cooperating contacts carried by the respective slidable members adapted to selectively engage the respective stationary contacts when said slidable members are actuated, and means for operating the slidable members.

2. A switch for operating an electric vehicle signal comprising an insulator block, the top face of the block being cut out to form a pair of independent angular channels, and a T-shaped wall between said channels, said channels extending from one end of the block to a point adjacent the opposite end thereof, a pair of members of the same cross sectional shape as the angular channels slidably arranged in the respective channels, retractile coil springs connecting the closed ends of the channels with the respective ends of the slidable members, contacts arranged in said channels, cooperating contacts carried by the respective slidable members adapted to selectively engage the respective stationary contacts when said slidable members are actuating, rods for operating the slidable members, said rods having their inner ends abutting the free ends of the respective slidable members, and springs connecting the rods with the respective slidable members.

Signed at New York, in the county of New York and State of New York, this 30th day of December, 1926.

ARMAND DAMICO.